A. H. KIDNEY.
CLEANING DEVICE.
APPLICATION FILED NOV. 19, 1910.
1,129,689.
Patented Feb. 23, 1915.
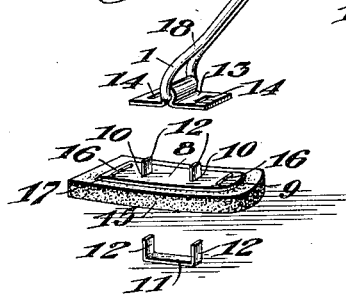
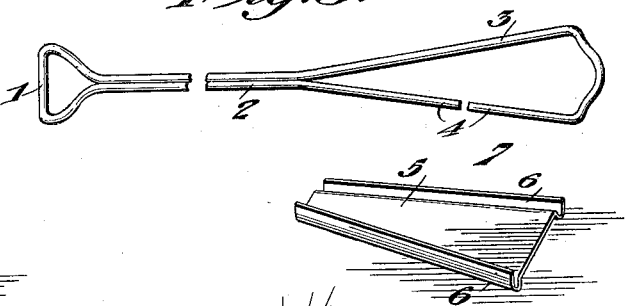
Witnesses
Lloyd W. Patch
A. A. Hammond
Inventor
Alfred H. Kidney
By Vernon E. Hodge
his Attorney

UNITED STATES PATENT OFFICE.

ALFRED H. KIDNEY, OF NEW YORK, N. Y.

CLEANING DEVICE.

1,129,689.   Specification of Letters Patent.   Patented Feb. 23, 1915.

Application filed November 19, 1910. Serial No. 593,251.

*To all whom it may concern:*

Be it known that I, ALFRED H. KIDNEY, a citizen of the United States, residing at New York city, in the county of New York and State of New York, have invented certain new and useful Improvements in Cleaning Devices, of which the following is a specification.

My invention relates to an improvement in cleaning devices for bottles, lamp-chimneys, and other articles of irregular internal outline, and the object is to provide a device in which the cleaning end will readily conform to and follow the surface to be cleaned, whether it be the inside of a bottle, carafe, lamp-chimney, fruit-jar, milk-bottle, water-jug, lantern globe, nursing bottle, incandescent bulbs, cut-glass ware, or what not, a handle of suitable design and construction being provided to afford easy means of manipulation of the device for the purposes for which it is intended.

With the foregoing objects in view, this invention comprises a handle and plate pivotally connected thereto, a cleaning pad removably attached to the plate, and means for readily fastening the plate to the handle.

My invention further consists in certain novel features of construction and combinations of parts which will be hereinafter described and pointed out in the claim.

In the accompanying drawings:—Figure 1 is a view in elevation, Fig. 2 shows a fragment of the handle, the plate pad being detached therefrom, Fig. 3 is a view of the handle with a portion broken out in the middle and showing the sheet-metal clamp detached therefrom. Fig. 4 is an enlarged fragmentary view showing the cleaner so arranged that one end is traversing a curved surface and used for scraping away a substance adhering thereto, and Fig. 5 is a view showing different positions taken in cleaning a carafe or similar article.

The handle is preferably made of a single wire of suitable size bent to form a loop 1 at one end, the intermediate shank 2 comprising two leads of the wire extending parallel to each other, and the handle proper 3, which is preferably made by the parts of the wire diverging some distance from each other into V-shape. The extreme ends 4, 4, come together at one side, and a binding clamp 5 of sheet-metal has its edges 6, 6, crimped around the wire, whereby this portion is braced, and made suitably rigid. A web 7 is formed at the center which increases the holding surface of the handle, besides strengthening it, and at the same time affords a means of carrying a name, legend, or advertising matter, if it is desired to use it for such purpose.

A backing-plate 8 is preferably rectangular in form at one end, and curved as at 9 at the other to be utilized as a scraper at that end, as illustrated in Fig. 4. This backing plate 8 is provided with slots 10, 10, and a fastener plate 11 has its ends 12, 12, passed through these slots 10, 10; and the clip 13 swiveled to the loop 1 also has slots 14, 14, adapted to correspond in position to the slots 10, 10, in plate 8, and to receive the ends 12, 12 of the fastener plate 11, after which the ends are bent over or opposite, as shown clearly in Figs. 1 and 4. The cleaning pad 15, 15, made of felt or other absorbent material is removably fastened to the backing-plate 8 by threads 16, 16, or other means extending through the perforations 17, 17.

The handle is preferably curved as at 18 to facilitate its operation, that is to say, in directing the cleaning pad 15 to the various positions and surfaces that the device is intended to clean, as by means of this curvature, constricted portions of the article, such as the neck, are readily cleared, as shown in Fig. 5; and furthermore, it facilitates the operation of the cleaning edge 9 of the plate when removing a substance adhering to the interior surface, as is illustrated in Fig. 4, the curvature 18 serving as a support for the angular end of the backing plate 8, while the curved end 9 is being utilized for the purpose specified and illustrated.

From the foregoing, it will be seen that I have provided a simple device, of few parts, easily manufactured, and capable of being placed on the market at a small initial cost, which, at the same time, will be most effectual in the accomplishment of the purpose for which it is intended.

More or less slight changes might be resorted to in the form and arrangement of the several parts described, without departure from the spirit and scope of my invention, and hence I do not wish to limit myself to the exact constructions herein set forth, but:—

Having fully described my invention, what I claim as new and desire to secure by Letters Patent, is:—

As an article of manufacture, a cleaning device comprising a wire handle having a curvature adjacent to one end, a back-plate pivotally connected at or near its center to the extreme end of the handle so that one end of the plate may rest upon the convex surface of the curved portion of the handle under certain circumstances, a pad attached to the back-plate sufficiently far from the end thereof so that the pad may be bent aside and the end of the plate utilized for scraping and cleaning interior surfaces while the opposite end is supported by the curvature of the handle.

In testimony whereof I affix my signature, in the presence of two witnesses.

ALFRED H. KIDNEY.

Witnesses:
  W. H. WINTERS,
  C. E. PÉQUIGNOT.